US008266393B2

(12) United States Patent
Moscibrod et al.

(10) Patent No.: US 8,266,393 B2
(45) Date of Patent: Sep. 11, 2012

(54) COORDINATION AMONG MULTIPLE MEMORY CONTROLLERS

(75) Inventors: Thomas Moscibrod, Redmond, WA (US); Onur Mutlu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 12/132,650

(22) Filed: Jun. 4, 2008

(65) Prior Publication Data

US 2009/0307691 A1 Dec. 10, 2009

(51) Int. Cl.
*G06F 12/00* (2006.01)
*G06N 7/00* (2006.01)
(52) U.S. Cl. ............... 711/154; 711/167; 711/E12.001; 718/100
(58) Field of Classification Search .................. None
See application file for complete search history.

(56) References Cited

U.S. PATENT DOCUMENTS

| | | | |
|---|---|---|---|
| 5,469,559 A | | 11/1995 | Parks et al. |
| 5,560,027 A | * | 9/1996 | Watson et al. .................. 712/12 |
| 6,026,464 A | * | 2/2000 | Cohen ........................... 710/242 |
| 6,334,167 B1 | | 12/2001 | Gerchman et al. |
| 6,378,018 B1 | | 4/2002 | Tsern et al. |
| 6,473,326 B2 | | 10/2002 | Brooks et al. |
| 6,529,442 B1 | * | 3/2003 | Wilcox ........................ 365/239 |
| 6,564,288 B2 | | 5/2003 | Olarig et al. |
| 6,598,140 B1 | * | 7/2003 | McAllister et al. ........... 711/168 |
| 7,155,623 B2 | | 12/2006 | Lefurgy et al. |
| 7,197,652 B2 | | 3/2007 | Keller, Jr. et al. |
| 7,613,941 B2 | * | 11/2009 | Samson et al. ................. 713/323 |
| 8,085,657 B2 | * | 12/2011 | Legg .............................. 370/229 |
| 2003/0009632 A1 | * | 1/2003 | Arimilli et al. ................ 711/137 |
| 2004/0006671 A1 | * | 1/2004 | Handgen et al. .............. 711/137 |
| 2006/0015683 A1 | | 1/2006 | Ashmore et al. |
| 2006/0123169 A1 | * | 6/2006 | Chai et al. ...................... 710/116 |
| 2006/0136767 A1 | | 6/2006 | Ma |
| 2007/0011421 A1 | | 1/2007 | Keller et al. |
| 2007/0101108 A1 | * | 5/2007 | Grossman et al. ............. 712/228 |
| 2007/0136545 A1 | * | 6/2007 | Kommrusch et al. ......... 711/169 |
| 2007/0233779 A1 | * | 10/2007 | Gaos et al. ..................... 709/202 |
| 2008/0040562 A1 | | 2/2008 | Gower et al. |
| 2009/0172345 A1 | * | 7/2009 | Allen et al. .................... 711/208 |

OTHER PUBLICATIONS

Hai Huang, et al. Design and Implementation of Power-Aware Virtual Memory. http://www.usenix.org/events/usenix03/tech/full_papers/full_papers/huang/huang.pdf. Last accessed May 16, 2008.
V. Delaluz, et al. DRAM Energy Management Using Sofware and Hardware Directed Power Mode Control. http://csdl2.computer.org/persagen/DLAbsToc.jsp?resourcePath4d1/proceedings/&toc=comp/proceedings/hpca/2001/1019/00/1019toc.xrd&DO1=10.1109/HPCA.2001.903260. Last accessed May 16, 2008.
Scott Rixner, et al. Memory Access Scheduling. Appears in ISCA-27 (2000).
Scott Rixner. Memory Controller Optimizations for Web Servers. In MICRO-37, pp. 355-366, 2004.

(Continued)

*Primary Examiner* — Jasmine Song
*Assistant Examiner* — Daniel Bernard
(74) *Attorney, Agent, or Firm* — Lyon & Harr, LLP; Richard T. Lyon

(57) ABSTRACT

Systems and methods that coordinate operations among a plurality of memory controllers to make a decision for performing an action based in part on state information. A control component facilitates exchange of information among memory controllers, wherein exchanged state information of the memory controllers are further employed to perform computations that facilitate the decision making process.

18 Claims, 10 Drawing Sheets

OTHER PUBLICATIONS

Kyle J. Nesbit, et al. Fair Queuing Memory Systems. In MICRO-39, 2006.

Onur Mutlu, et al. Stall-Time Fair Memory Access Scheduling for Chip Multiprocessors. In MICRO-40, 2007.

Onur Mutlu, et al. Enhancing the Performance and Fairness of Shared DRAM Systems with Parallelism-Aware Batch Scheduling, Submitted to ISCA, 2008.

* cited by examiner

COORDINATION AMONG MULTIPLE MEMORY CONTROLLERS

BACKGROUND

A computing system is typically composed of hardware and software components that interact with each other. The hardware components can be described generally as segments of such computing system that are physically tangible, such as processors, memory chips, hard drives, connecting wires, traces, and the like. Moreover, such processing hardware components are constructed to recognize two logical states, namely a "0" state (or low electrical state) and a "1" state (or high electrical state). Employing a number of such states together in a sequence allows data to be stored and processed by the hardware.

Furthermore, hardware manufacturers are developing computing platforms with multiple processors—as opposed to a single processor—which can further contain multiple processing cores instead of what used to be only a single processor core. Additionally, recent trends have produced processors with multiple "logical" processors, as employed in simultaneous multi-threading, for example. Such logical processors typically share functional resources including adders, memory storage mediums and the like. Likewise, caches can now be shared between both physical and logical processors. Similarly, buses can further be implemented as shared resources for efficiency gains and/or reduction in complexity and cost. Accordingly, hardware components in a computing system are becoming more complex in their architecture, which substantially varies with each computing platform.

Moreover, with the trend towards multi-core architectures, associated systems consisting of multiple memory controllers are becoming increasingly significant. In general, each memory controller can be treated as an independent entity that performs its own decision-making. For example, core processing systems can include N cores and M memory controllers (where N, M are integers), and a "core" can include: instruction processing pipelines (integer and floating-point), instruction execution units, and the L1 instruction or data caches. For example, many general-purpose computers manufactured today resemble dual-core systems (N=2), wherein two separate, yet identical cores can exist. In multi-processor based system architectures, cores can exist on the same or different physical chips, which may or may not be identical.

In such systems, each core can have its own private L2 cache, or alternatively the L2 can be shared between different cores. Moreover, regardless of whether or not the L2 cache is shared, the physical DRAM Memory (e.g., the memory banks in which the actual data is stored) of current multi-core systems is typically shared among all cores. Hence, memory requests from different threads executing on different cores contend for the same memory system, which can further require appropriate buffering and scheduling policies.

Moreover, the totality of a system's DRAM memory can be partitioned across multiple DRAM memory chips. Typically, a DRAM memory chip is organized into multiple banks. Each bank stores a subset of the total physical memory managed by the DRAM memory chip. An underlying concept for organizing DRAM memory chips into multiple banks is that memory requests to different banks can be serviced in parallel. For example, each DRAM bank has a two-dimensional structure, consisting of multiple rows and columns. Consecutive addresses in memory are located in consecutive columns in the same row. The size of a row varies, but it is usually between 1-32K bytes in commodity DRAMs. Efficient request scheduling to the DRAM requires sophisticated and complex scheduling decisions in order to achieve high performance.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation coordinates operations among a plurality of memory controllers to make a decision for performing an action based in part on state information, via a control component(s). Such control component can facilitate exchange of information among memory controllers, and can be implemented as part of both a central, or distributed system architecture. The state information for a memory controller can encompass attributes such as load (e.g., number of requests), load per thread, row buffer hit-rate, and the like. In a related aspect, each memory controller can include a respective control component, wherein the control components can then exchange information and communicate via a communication layer (e.g., centralized, distributed, message based, and the like), to reach a collective decision for performing an action(s) (e.g., energy conservation). The exchanged state information of the memory controllers can subsequently be employed to perform computations that facilitate the decision (e.g., a joint decision). Although the subject innovation is primarily described in context of DRAM memory systems and mainly in multi-core systems, it is to be appreciated that the subject innovation is not so limited, and other systems having different memory controllers are well within the realm of the subject innovation.

As such, a memory controller can obtain information from other memory controllers, wherein based on such collected information a decision is made and a specific action is performed. In one aspect, such decisions and actions can be coordinated to yield joint decisions across different controllers and/or each controller can make a respective independent decision based on state information(s). Such decision can pertain to adjustment of behavior and/or operation, such as modifications for a memory controller's clock frequency, scheduling policy, buffer size, fairness policy, or any combination thereof.

In a related methodology in accordance with an aspect of the subject innovation, initially communication is established among a plurality of memory controllers to facilitate exchange of state information therebetween. Subsequently, state information can be exchanged between the memory controllers. Based in part on such state information computations can be performed to decide a course of action for the memory controller(s). Subsequently and based on such computations, an action(s) can then be taken by the memory controller(s). For example, multiple memory controllers can exchange state information (via a hardware communication substrate) to coordinate their scheduling actions and algorithms in order to reduce energy consumption.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
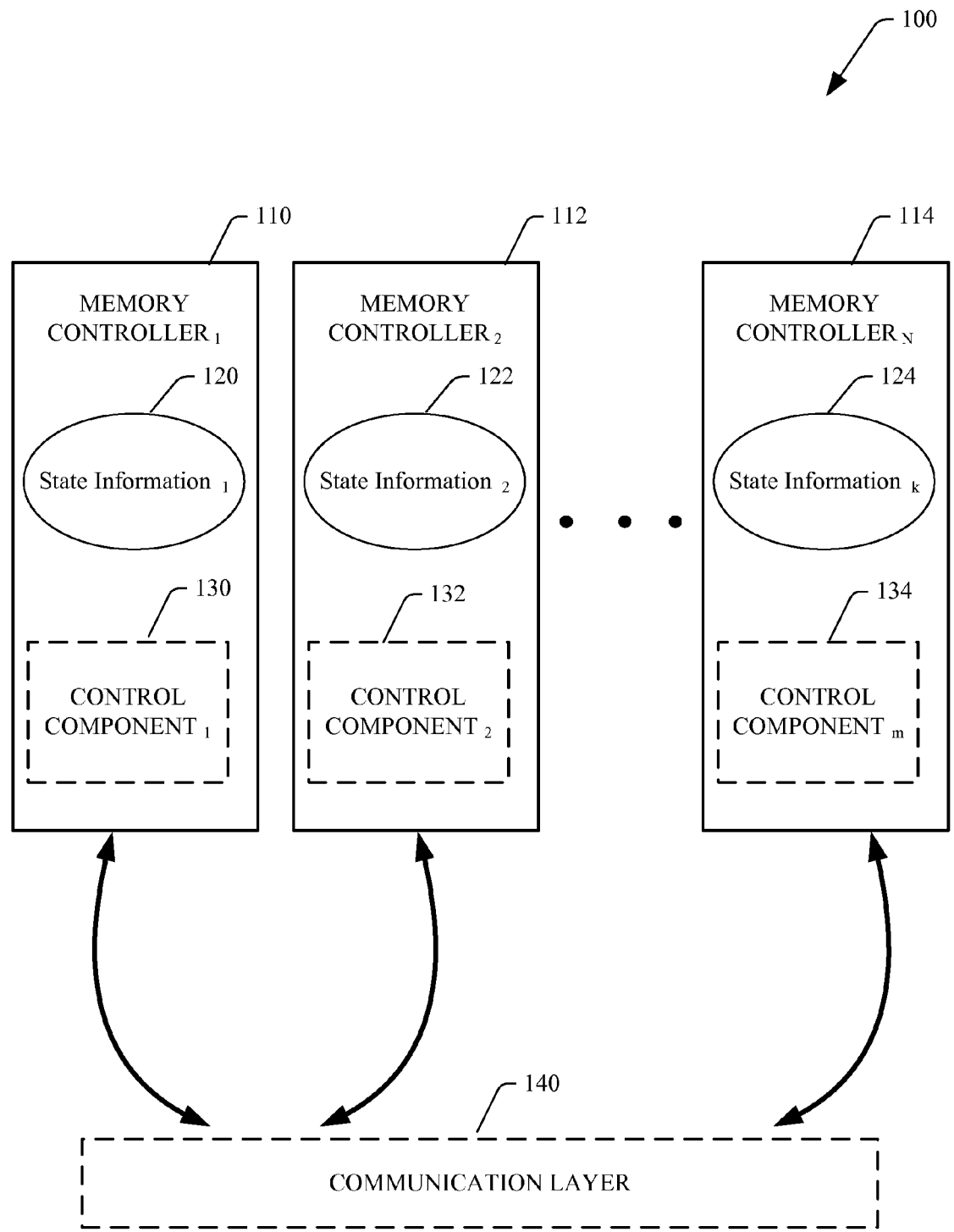
FIG. 1 illustrates a block diagram of control components that exchange state information according to an aspect of the subject innovation.

FIG. 1 illustrates a schematic block diagram for a system 100 of memory controllers that can exchange state information for subsequent action in accordance with an aspect of the subject innovation. The system 100 enables the memory controllers 110, 112, 114 (1 thru N, where N is an integer) to coordinate operations and make a decision(s) for performing an action(s) based in part on the state information 120, 122, 124 (1 thru k, k being an integer.) Moreover, each of the memory controllers 110, 112, 114 can further include buffers and scheduling logic that govern the access to a memory chip or to a memory bank. In one aspect, the memory controller can act as a mediator between processors and the memory, wherein processors' memory requests can be satisfied while complying with timing and resource constraints of banks, chips, and address/data buses associated with the memory. Each of the memory controllers 110, 112, 114 is responsible for controlling a respective chip or bank. The memory controllers 110, 112, 114 can themselves be physically located on different chips. Likewise, in case of a single-chip, multi-core architecture, the memory controllers 110, 112, 114 can be located on a single chip, for example. As such, the control components 130, 132, 134 can facilitate exchange of information among the memory controllers 110, 112, 114, and can be implemented as part of both a central, or distributed system architecture.

Moreover, the state information 120, 122, 124 can encompass a variety of attributes. As described in detail infra, depending on the coordination mechanism that is implemented, different state information can be exchanged between memory controllers via the communication layer 140. The state information 120, 122, 124 can for example encompass the information, such as: load (e.g., the number of memory requests currently in the memory request buffer of the memory controller); or load per thread T, (e.g., the number of memory requests issued by a hardware thread T that are currently in the memory request buffer), wherein such information can be obtained for every hardware thread T. Also, aggregate functions of this thread-specific load can be computed and exchanged. For example, memory controllers can exchange the maximum load of any thread, or the average load per thread, or similar aggregate functions. The state information 120, 122, 124 can further include additional information such as: the row-buffer hit-rate of outstanding requests. Other more specialized information can also be part of the state to be exchanged. For instance, threads can exchange the average row-buffer hit rate of all requests that have been serviced by this controller. As described in detail infra, such information can further facilitate determining a scheduling policy to apply.

As another example, the state information 120, 122, 124 can further include the row-buffer hit-rate of outstanding requests per thread T, wherein such represents a thread-specific row-buffer hit rate. It is to be appreciated that the above lists are exemplary in nature, and the state information can include other attributes such as priority information about the threads that have outstanding requests currently in the buffer, fairness information (e.g., which thread has suffered the highest slowdown relative to other threads accessing the memory system in a particular controller), information from an operating system, other software, virtual machines, and the like.

As illustrated in FIG. 1, the memory controllers 110, 112, 114 can communicate through communication layer 140, to exchange information about their state (e.g., a current state) with each other. Based on such information, and computations stemming in part therefrom, the memory controllers 110, 112, 114 can then take actions, to improve performance, efficiency, or fairness metrics (e.g., energy efficiency). For example, based on the gained information, each individual memory controller can take one or several actions that reduces energy consumption. If such actions are performed in a coordinated manner, the energy consumption can be reduced without substantial reduction of overall memory performance.

According to a particular aspect, the communication layer 140 can implement communication via a common global structure; or communication via a shared broadcast channel or a communication (interconnection) network (e.g., a ring, a grid, an omega network, a butterfly network, or a combination thereof.) In case of a common global structure or repository, each memory controller can identify its characteristics of the state and number of requests that are buffered—to the global information repository. In addition, the global information repository can maintain load information regarding all request buffers associated with the memory controllers 110, 112, 114. Moreover, if the state 120, 122, 124 of a memory controller changes, the memory controller 110, 112, 114 that initiates the change can subsequently modify the global structure. Next, each memory controller 110, 112, 114 can periodically read the relevant information from the global structure and takes appropriate actions accordingly.

Likewise, if the communication layer 140 implements a common shared broadcast channel, whenever a memory controller desires to inform other controllers of an important state change, it can send a broadcast message(s) to the other controllers on the broadcast channel. Accordingly, other memory controllers receive such message(s) containing the updated state information. Based on such received information, the other memory controllers can take appropriate actions, as described in detail infra. Similarly, if the communication layer 140 implements communication links between pairs of memory controllers over which state information can be exchanged; routing procedures can be enforced (e.g., bidirectional ring topology, or a mesh topology). For example, memory controllers can be connected with links that collectively form a ring, and each message is simply forwarded along the ring until it reaches its destination.

It is to be appreciated that state information can be exchanged between any number of memory controllers and can further be based on load of specific threads or on load of threads having a certain priority-level. For example, the memory controllers can also exchange the load per thread, or the load of all threads having a certain priority-level, or the total load, or a combination thereof—hence fine tuning the same mechanism to capture more specific (e.g., thread-specific, or priority-specific) requirements. As another example, the memory controllers can desire exchange of load information regarding highest-priority threads, because other threads can be of less importance.

It is further appreciated that the information exchange between memory controllers can occur periodically and in fixed pre-determined intervals (for instance, every 100 memory clock cycles), or whenever a state-change (e.g., pre-determined) has occurred at a memory controller. For instance, if the load in the buffer of a memory controller exceeds a certain threshold, it can convey such information to other controllers. As such, operation among the plurality of memory controllers can be coordinated and a decision reached for performing one or more actions for operation of the system 100. For example, such action of the memory controllers 110, 112, 114 can relate to reducing energy consumptions.

Figure 2:
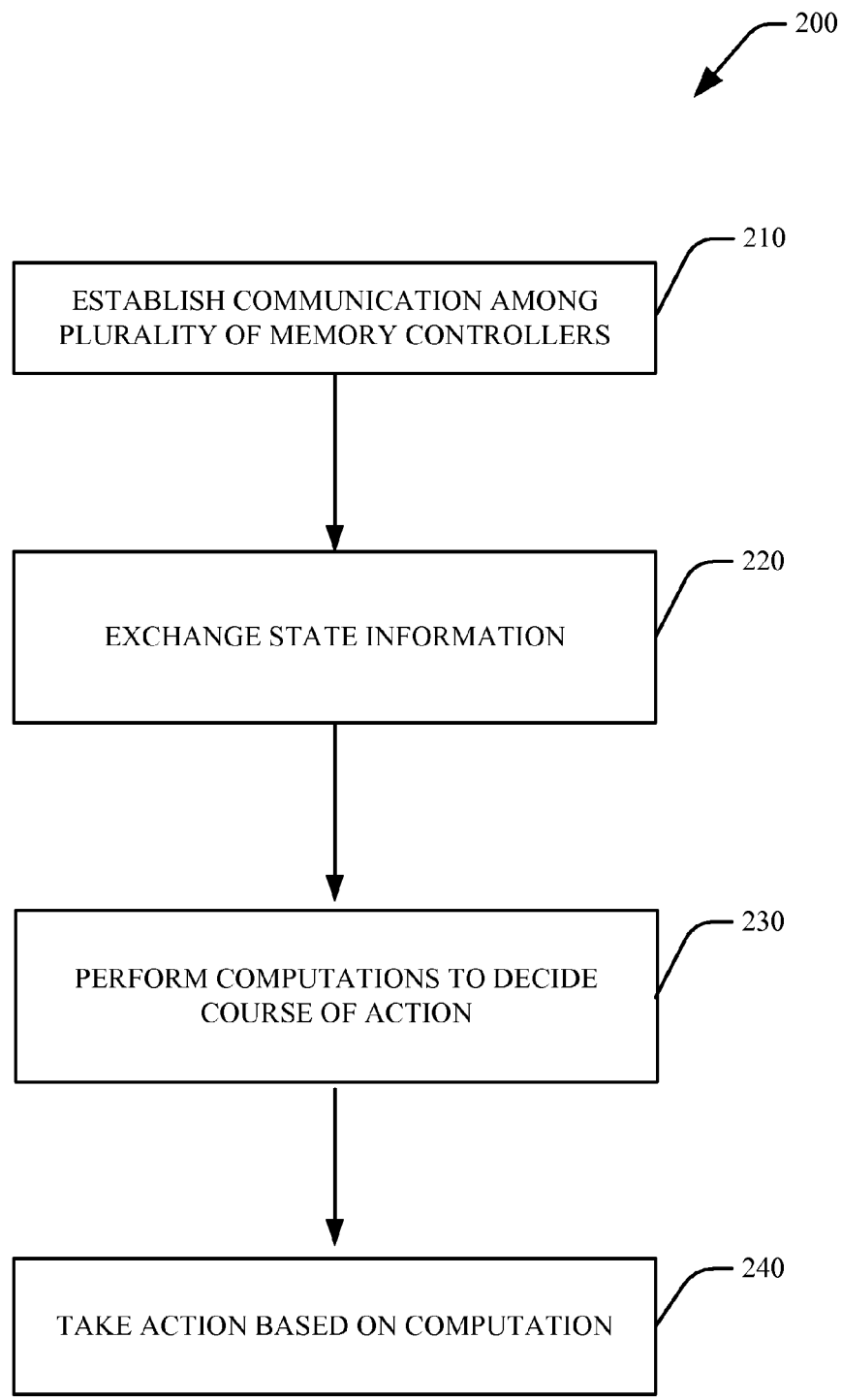
FIG. 2 illustrates a related methodology of coordinating memory controllers to take an action according to an aspect of the subject innovation.

FIG. 2 illustrates an exemplary methodology 200 of decision making for performing an action based in part on state information. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 210, communication is established among a plurality of memory controllers to facilitate exchange of state information (e.g., via a handshake protocol) Subsequently, and at 220 state information can be exchanged between the memory controllers. Based in part on such state information, various forms of computations (as described in detail infra) can be performed at 230 to decide a course of action for the memory controller(s). Subsequently, and at 240 based on such computations an action(s) can be taken by the memory controller(s). For example, multiple memory controllers can exchange state information (via a hardware communication substrate) to coordinate their scheduling actions and algorithms in order to reduce energy consumption. Accordingly, FIGS. 3-6 illustrate several actions that a memory controller can perform to reduce energy consumption, for example.

Figure 3:
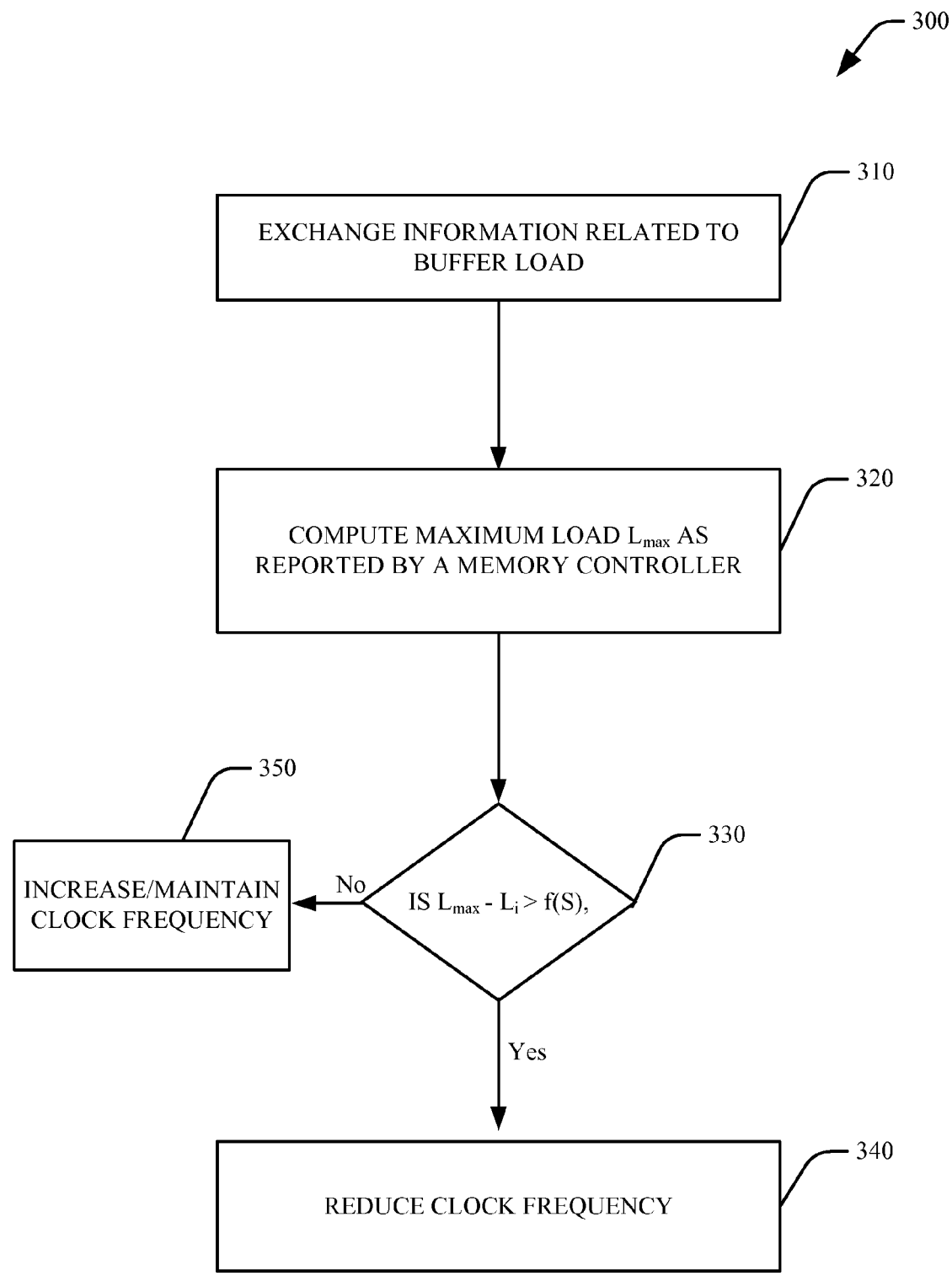
FIG. 3 illustrates a further methodology of adjusting a clock rate according to an aspect of the subject innovation.

FIG. 3 illustrates a related methodology 300 of clock frequency adjustment according to a further aspect of the subject innovation. In general, higher clock frequency of a memory controller represents faster execution, and yet higher energy consumption. As such, one course of action taken based on shared information of memory controllers can include reducing clock frequency of memory controllers that have substantially less load than other memory controllers.

For example, if a memory controller only has modest load, then it is unlikely to be the main performance bottleneck for the applications running on the one or more cores. In particular, an application typically stalls (and waits) for the 'oldest' outstanding request that it has issued, and which has not yet been serviced. Hence, if an application has many outstanding requests in DRAM memory controller C1, but only very few in DRAM memory controller C2, it is likely that the application is stalled because of one of its requests in C1's buffer. Accordingly, it is more likely that the application's oldest request is in C1, rather than in C2. Hence, if a memory controller C has substantially less load than one or more of the other controllers in the system, it can reduce its clock frequency without a high risk of having a substantially large impact on overall performance.

Initially and at 310, each memory controller $C_i$ periodically (or when triggered by a substantially large change in the buffer load) informs other memory controllers about its current buffer load $L_i$ by employing a communication substrate. Subsequently, and at 320 a memory controller can compute the maximum load $L_{max}=\max_i L_i$ reported by any of the memory controllers. Next and at 330 a comparison can be performed between $L_{max}-L_i$ and a threshold function f(S). It is to be appreciated that the differential function is exemplary in nature, and typically any other computable function $g(L_{max}, L_i)$ that captures a relative relationship between $L_{max}$ and $L_i$ can also be employed. If for a memory controller $C_i$, $L_{max}-L_i>f(S)$, then the methodology 300 proceeds to act 340 and $C_i$ reduces or maintains its clock frequency. Alternatively, if $L_{max}-L_i \leq f(S)$ then the methodology 300 proceeds to act 350 and $C_i$ increases its clock frequency, or maintain its frequency if it already runs at a desired speed. The threshold function f(S) can depend on the system state (as exchanged between the memory controllers by employing the communication substrate) and can be implemented in various different ways. For example, in a simple implementation, the threshold function is simply a constant, e.g., f(S)=T, where T is a fixed or predetermined threshold that expresses by how many requests $L_i$ should be less loaded than the maximally loaded controller before it can decrease its clock frequency. Moreover, f(S) can further take into account the size of different memory request buffers, a notion of priority between the memory controllers, and the like. It is to be appreciated that the load $L_i$ of a memory controller can either be expressed relative to the memory controller's buffer size (e.g., what fraction of the buffer is filled with requests, and what fraction is empty), or in absolute terms (e.g., how many requests are currently in the buffer). In addition, f(S) can be a function determined by the system software (e.g. an operating system) and communicated to the memory controller, when such memory controller can be programmed by system software via machine language instructions, for example.

Figure 4:
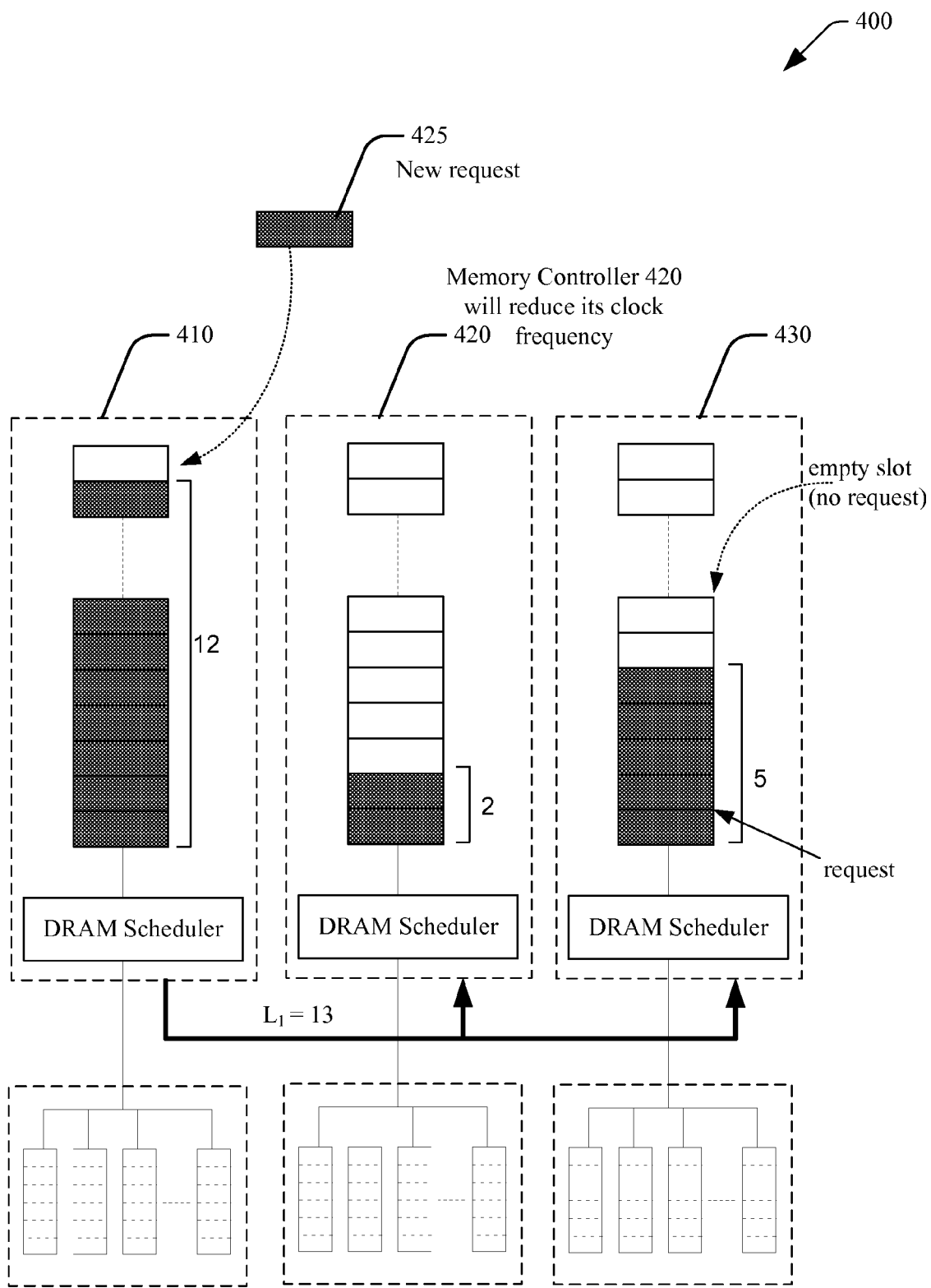
FIG. 4 illustrates a system for clock rate adjustment according to a further aspect of the subject innovation.

FIG. 4 illustrates a system 400 for an action taken by a memory controller(s) for adjustment of a clock rate(s) (e.g., clock frequency), which can be based on relative load distribution of the different memory controllers in the system. For example, since energy consumption can typically increase quadratically as a function of the clock frequency, reducing a clock frequency and running operation of a memory controller conserves energy. Such reduction can further opportunistically be performed on selective memory controllers that have relatively less load (e.g. fewer number of memory requests) than other memory controllers. Hence, extra energy consumption can be eliminated—since allowing such memory controllers to execute memory requests at a slower pace has little or no impact on overall system performance, as experienced at the application layer.

As further illustrated in FIG. 4, three memory controllers 410, 420, 430 can implement a broadcast channel communication substrate to execute a methodology according to the subject innovation. In this example, the threshold function employed is f(S)=10, e.g., a fixed constant threshold, and the loads of different controllers are expressed in absolute terms. Initially, the load of memory controller 410 is L1=12, the load of memory controller 420 is L2=2, and the load of memory controller 430 is L3=5. Subsequently, one of the cores can issue a new memory request 425 that is inserted into the memory request buffer of the memory controller 410, increasing its load to 13. Subsequently, the memory controller 410 can send a message containing its new load $L_1$=13 to memory controllers 420 and 430. Since the new $L_{max}$ is now 13, the memory controller 420 can reduce its clock frequency (since 13−2 is greater than the threshold 10) and therefore save energy. Likewise, the memory controller 430 can continue to execute at the higher clock frequency, because $L_{max}$−$L_3$=13−5=8, which is less than the threshold 10.

Figure 5:
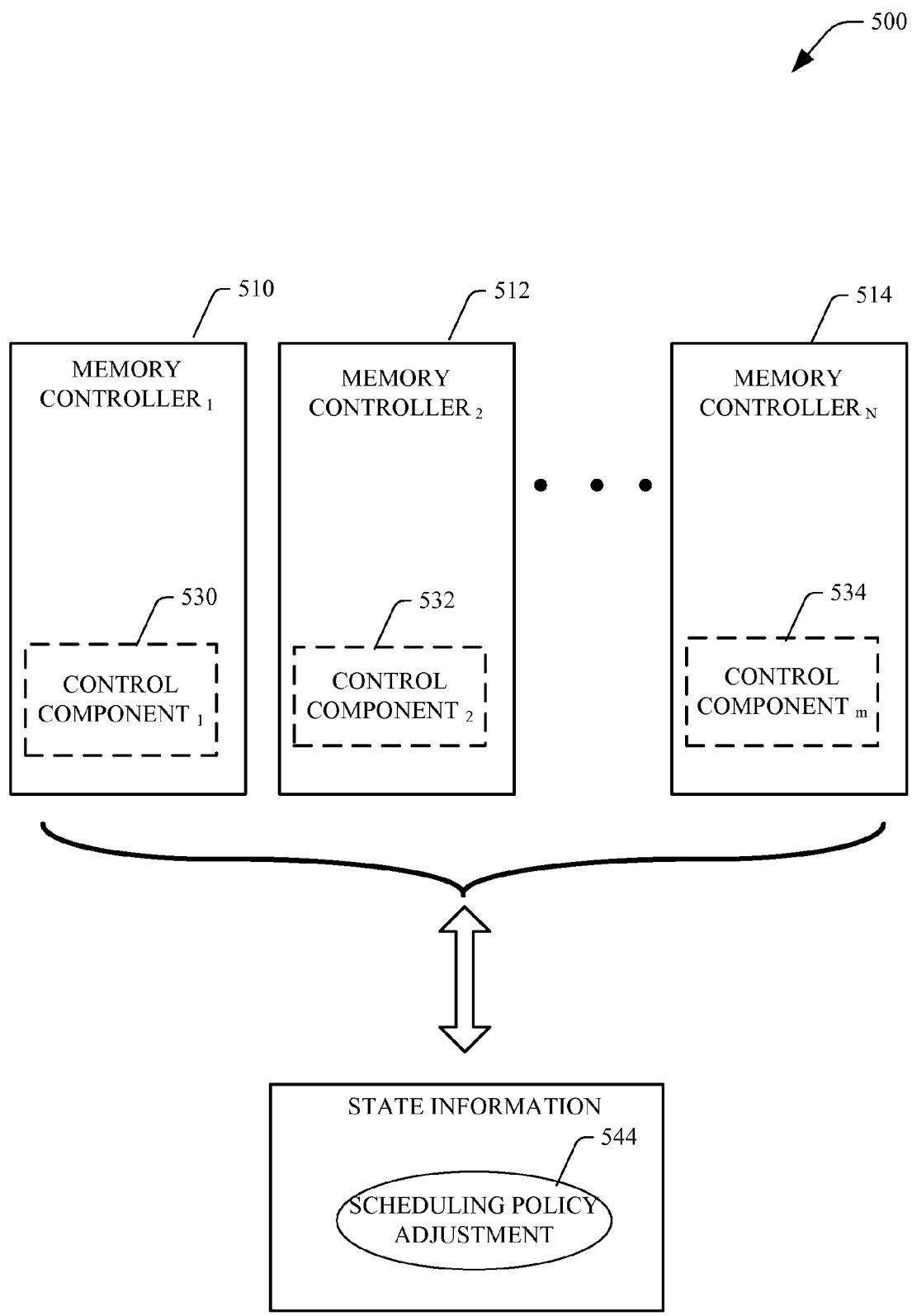
FIG. 5 illustrates a block diagram for a memory controller(s) that can adjust their scheduling policy according to an aspect of the subject innovation.

FIG. 5 illustrates a related action taken by the memory controllers 510, 512, 514, via the control components 530, 532, 534, wherein the action pertains to adjusting a scheduling policy 544 for the memory controllers 530, 532, 534. Such can include adaptively changing the memory request scheduling policy employed at individual memory controllers depending on the overall state of the system 500, such as for example the relative load distribution. Typically, a DRAM access scheduler (not shown) can select from among all requests that are currently in the memory request buffer, a request that is sent to (and hence, serviced by) the DRAM memory chip next. For example, the DRAM Access Scheduler can decide which DRAM command to issue in every DRAM clock cycle. Such can consist of a logic that keeps track of the state of the DRAM (banks, bus, and the like) and timing constraints of the DRAM. It takes as input the state of the memory requests in the request buffer along with the state of the DRAM, and decides which DRAM command should be issued based on the implemented scheduling and access prioritization policies (which typically attempt to optimize memory bandwidth, latency, and fairness).

It is to be appreciated that there exists a trade-off between the complexity of the memory controller (in terms of logic required to implement the scheduling algorithm) and the resulting memory performance in terms of overall throughput and fairness across different cores and threads. As such, a DRAM controller implementing a substantially simple scheduling algorithm can yield less fair performance than when implementing a more complex scheduling algorithm. Hence, a memory controller can adaptively change its DRAM scheduling policy, wherein if the specific controller is not a bottleneck in the system, or if the total memory load is low, then such memory controller can adaptively switch to a simpler, more energy-efficient DRAM scheduling policy. Hence, only memory controllers with high load relative to other DRAM controllers can be required to employ a more complex and efficient scheduling policy.

Put differently, highly efficient scheduling decisions are typically required in memory controllers that are the performance bottleneck in the system. Memory controllers that have significantly less load than others can afford a reduction of their scheduling efficiency—similar to reducing their clock frequency as described earlier. Accordingly, such memory controllers can switch to a less complex memory scheduling policy that requires maintaining less state and logic, wherein each memory controller can implement multiple scheduling policies to switch therebetween.

Figure 6:
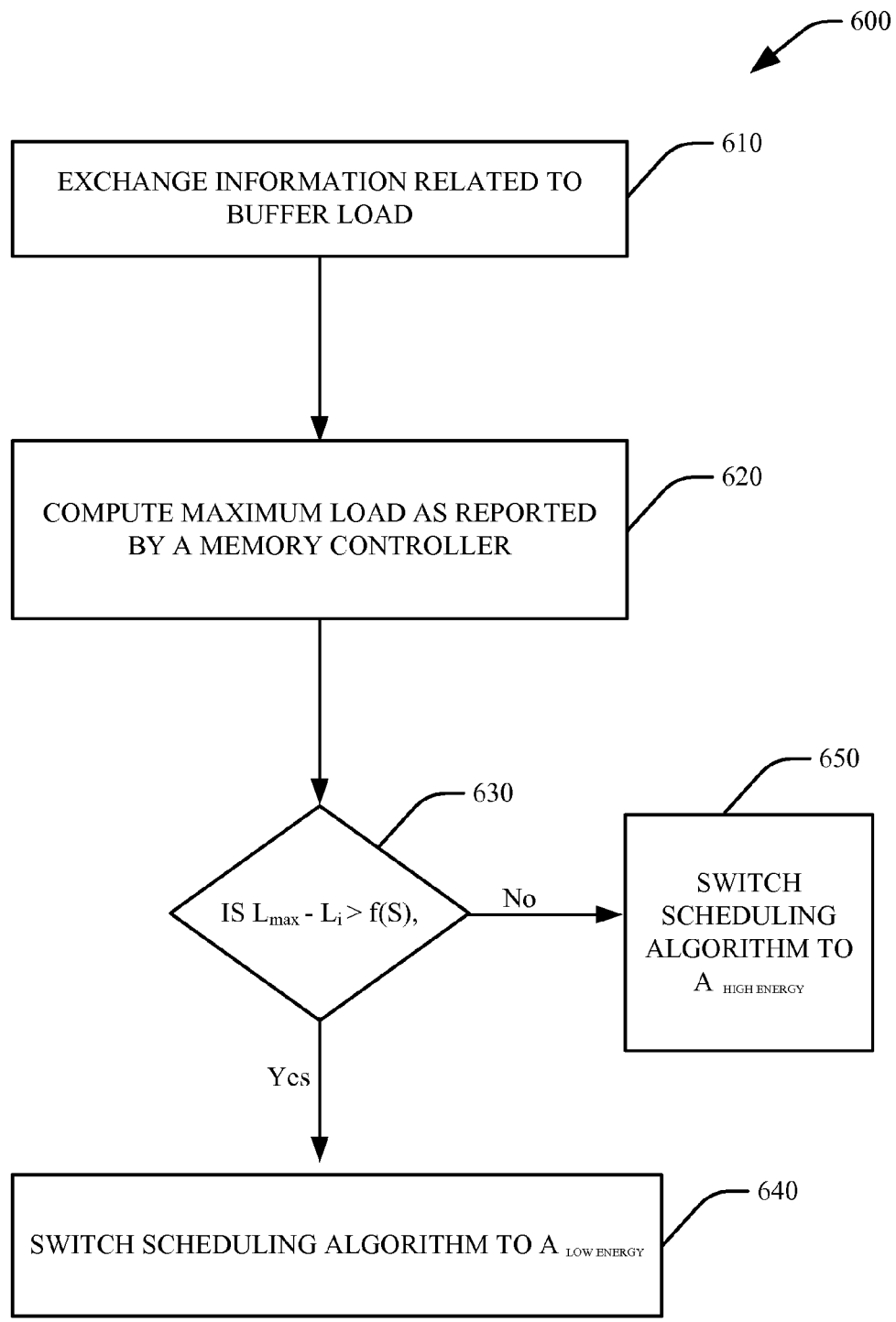
FIG. 6 illustrates a methodology of a modifying a scheduling policy according to a further aspect of the subject innovation.

FIG. 6 illustrates one particular implementation that employs a function f(S), which can be computable in a plurality of ways based on a system state. Initially and at 610, information regarding the current buffer load ($L_i$) can be exchanged among a plurality of memory controllers. Subsequently and at 620, each memory controller can compute the maximum load $L_{max}$=$\max_i L_i$, which can be reported by any of the memory controllers. A decision is made at 630, wherein $L_{max}$−$L_i$ is compared to f(S). If for a memory controller $C_i$, $L_{max}$−$L_i$>f(S), then $C_i$ switches to less energy-consuming (which can possibly be less efficient or more unfair) scheduling algorithm $A_{low-energy}$, at 640. Otherwise, if $L_{max}$−$L_i$<f(S), the memory controller switches to a more efficient, and yet more energy-consuming scheduling algorithm $A_{high-energy}$ at 650. Exemplary algorithms that can be employed for the above acts are; First-Come First-Serve (FCFS) scheduling policy for $A_{low-energy}$; First-Ready First-Come First-Serve (FR-FCFS) scheduling policy for $A_{high-energy}$. It is to be appreciated that any existing or future memory request scheduling algorithm such as Stall-Time Fair Memory Access Scheduling (STFM); Parallelism-Aware Batch Scheduler (PAR-BS), Network Fair Queuing (NFQ), and the like can further be employed as $A_{low-energy}$ or $A_{high-energy}$.

Moreover, it is to be appreciated that the above can be generalized to capture other important performance metrics beyond the efficiency (fast, slow), such as fairness, for example. For instance, it is possible to alternatively switch between a fairness-maintaining scheduling policy such as STFM, and (in case fairness in not a big issue in the system) a potentially efficient, but unfair FR-FCFS policy depending on the state of the system. In addition, memory controllers can switch among more than two scheduling policies, all of which can have different energy consumption or fairness characteristics.

Figure 7:
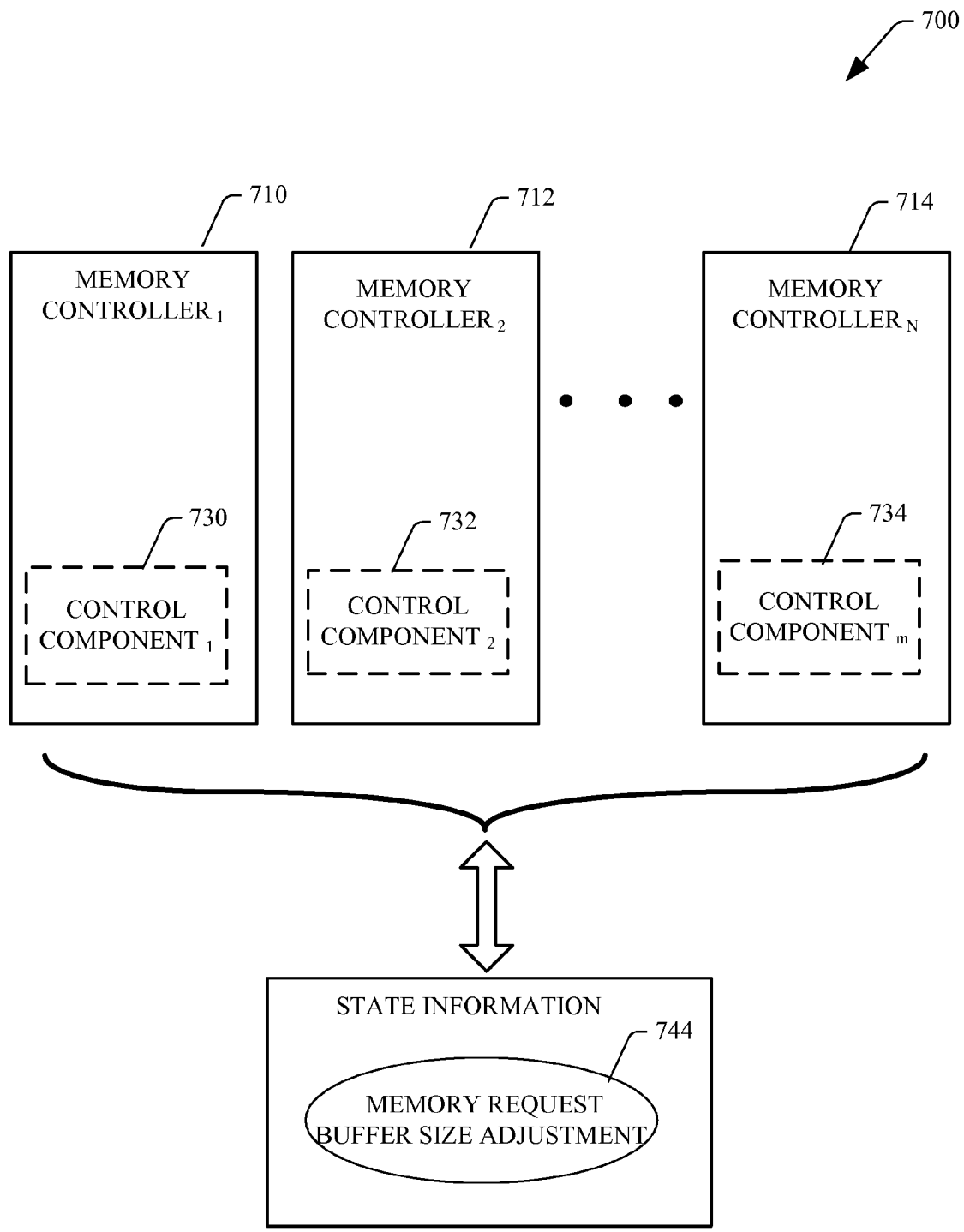
FIG. 7 illustrates a block diagram for a memory controller(s) that adjusts memory buffers according to a further aspect of the subject innovation.

FIG. 7 illustrates a related system 700 that facilitates action taken by the memory controllers 710, 712, 714, via the control components 730, 732, 732, which pertains to adjusting the size of memory request buffers 744 at individual memory controllers depending on the overall state of the system—such as depending on the current buffer load at other memory controllers, for example.

In general, when a memory access by a processor results in a cache-miss (e.g., when the data item has to be read from or written to the DRAM memory), a "memory request" is issued and inserted into the memory request buffer of the appropriate memory controller (e.g., the memory controller that controls the DRAM bank in which the required memory address is located). In such a buffer, the request awaits to be scheduled to the appropriate DRAM memory chip, where it is serviced. The memory request buffer can hold a state associated with each memory request (e.g. the address, type, identifier, age of the request, readiness, completion status, and the like). In addition, the memory request buffer can be physically or logically arranged in a variety of implementation. For example, such can include a single buffer for all memory chips and all banks; or a logically or physically partitioned buffer, one partition for each bank, and the like.

Moreover, the size of a DRAM memory controller's memory request buffer can signify an important system parameter. For example, if the buffer is large, the likelihood of the buffer becoming full is low, and hence, processors typically have to stall less—(if a processor misses in the cache and needs to issue a memory request buffer while the buffer is full, the processor necessarily has to stall until there is free space in the buffer). Furthermore, larger buffers allow for more optimized scheduling decisions, since the more memory requests are in the buffer, the more choice and flexibility the DRAM scheduling policy has for determining and optimizing its scheduling decisions, and hence, the better it can perform scheduling tasks. At the same time, each slot in the memory request buffer needs to be powered as it participates in scheduling. Accordingly, the larger the memory request buffer is, the higher is the associated energy consumption. The control component of the subject innovation enables decisions regarding adjusting size of the memory request buffer at individual controllers. Put differently, if one controller has substantially less load than another controller, then the size of its memory buffer can be reduced in order to save energy. The methodologies that employ such technique can further be implemented as part of the earlier discussed methodologies.

Figure 8:
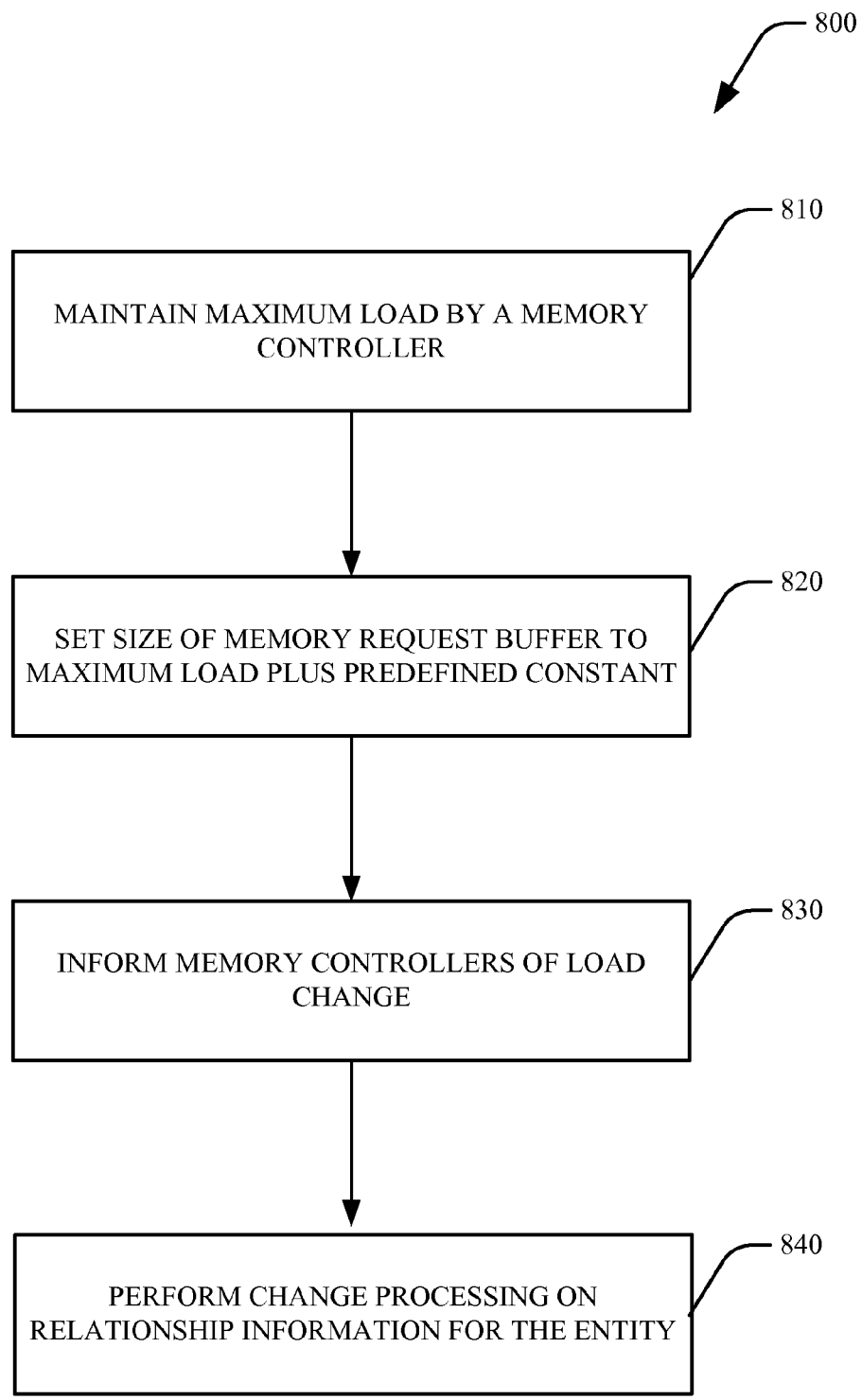
FIG. 8 illustrates a block diagram of adjusting a memory buffer according to a further aspect of the subject innovation.

FIG. 8 illustrates a methodology 800 that adjusts memory buffers according to a further aspect of the subject innovation—which can further be implemented in conjunction with methodologies described above. In general, memory requests often occur in bursts and hence, if a thread issues substantial memory requests to a memory controller in a short time, it is likely that the same thread can issue a large number of memory requests to another memory controller shortly thereafter. Such phenomenon can be exploited by exchange of state information among memory controllers for taking energy-efficient actions. Initially and at 810, each memory controller $C_i$ can maintain the value $L_{max}$, which is the maximum load of any memory controller in the system. Next and at 820, each memory controller sets the size of its memory request buffer to $X*L_{max}$ where X is a pre-defined constant. (or alternatively $X+L_{max}$). At 830, if a substantially large number of memory requests are issued for a memory controller $C_i$, which leads to an increase in $L_{max}$, then $C_i$ informs all other memory controllers of this change. At 840, other memory controllers can also increase size of their memory request buffer accordingly (based on the new $L_{max}$)

Such methodology 800 can pro-actively anticipate the bursts generated by the memory controllers and typically maintain the size of all memory request buffers at a level that leaves enough empty slots for newly issued requests and further does not waste space by maintaining too many empty slots in the buffer that are not needed. Accordingly, when a thread starts having a burst, memory controllers can be warned in advance that they can also experience a burst of issued memory requests soon, which enables them to increase the size of their buffer ahead of time. At the same time, memory request buffer sizes are only slightly larger than $L_{max}$, which can contribute to saving energy.

It is to be appreciated that the computation performed by each memory controller on the data received from other memory controllers based on exchange of state information can further accept input by external components such as other software, operating systems (e.g. thread priority), virtual machines, assembly programmers, compilers, software controlled coordination, and the like for energy savings. For example, such can require the instruction set architecture of the computing system to be augmented with special instructions that allow the software to change the clock frequency, scheduling algorithm, and buffer size of different memory controllers. Exemplary instructions that change the size of the buffers, frequency, and scheduling policy in a memory controller can include the following at the assembly language level:

change-mc-size MC2 32
change-mc-freq MC2 1000
change-mc-schedpolicy MC2 FCFS

The effect of such three instructions, when executed in sequence can be to change the size of the buffer of the memory controller number 2 to 32 entries, the frequency of controller number 2 to 1000 MHz and the scheduling algorithm of controller number 2 to FCFS (first come first serve). Software can appropriately issue such instructions to control energy consumption in memory controllers.

It is to be appreciated that the subject innovation includes broadly other instructions that can change different characteristics of a memory controller. For example, one can conceive of an instruction that sets the row-buffer policy of a memory controller (e.g., whether or not it should close a row-buffer immediately after servicing the request that accessed the row buffer).

Figure 9:
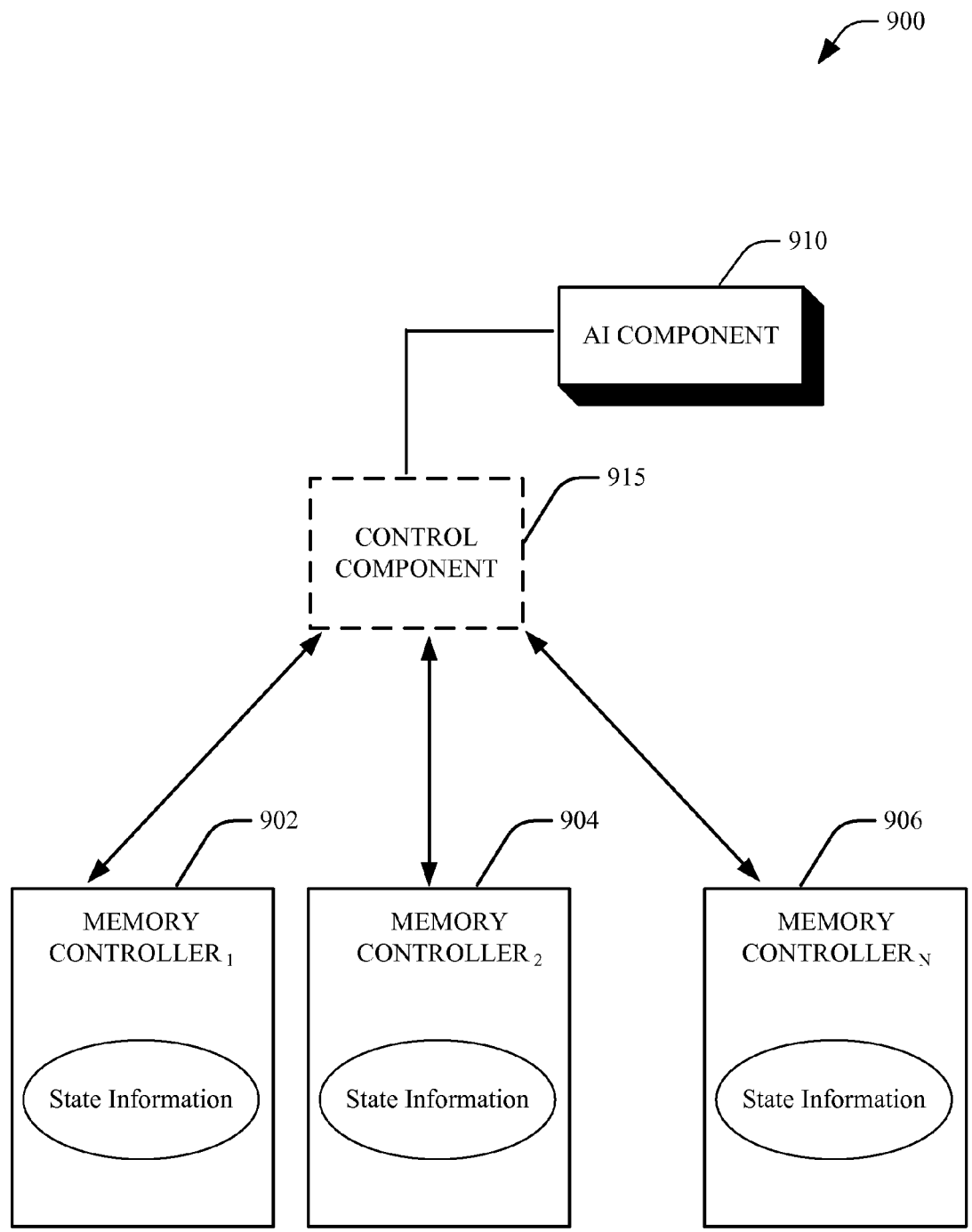
FIG. 9 illustrates an artificial intelligence component that infers taking actions according to an aspect of the subject innovation.

FIG. 9 illustrates an artificial intelligence (AI) component 910 that can be employed to facilitate inferring and/or determining when, where, how to coordinate activities of memory controllers 902, 904, 906 (1 to N, N being an integer), via the control component 915 in accordance with an aspect of the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 910 can employ any of a variety of suitable AI-based schemes as described supra in connection with facilitating various aspects of the herein described invention. For example, a process for learning explicitly or implicitly how the memory controllers 902, 904, 906 jointly decide a course of action can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
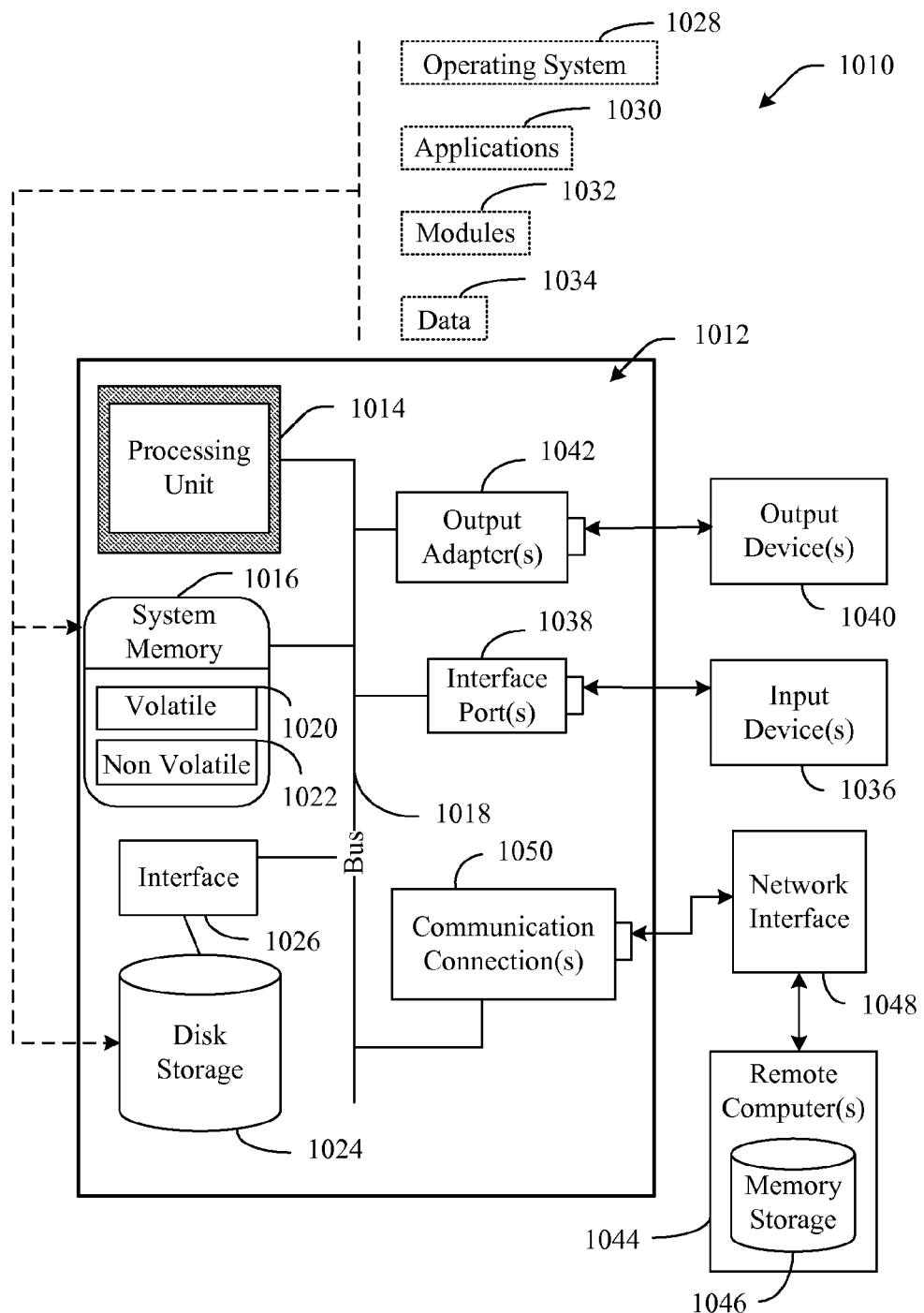
FIG. 10 illustrates an exemplary environment for implementing various aspects of the subject innovation.

In order to provide a context for the various aspects of the disclosed subject matter, FIG. 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

As used in this application, the terms "component", "system", "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates a disk storage 1024, wherein such disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system, comprising
a plurality of memory controllers configured to exchange state information;
a control component configured to decide a course of action for the plurality of memory controllers, the course of action being associated with an operation adjustment of at least one of the plurality of memory controllers, and based at least partly on the state information as applied in comparing of a buffer load for at least one of the memory controllers with a predetermined threshold, the comparing including determining whether a difference between a maximum load among the plurality of memory controllers, and a current load of a memory controller, is greater than a threshold function, the threshold function configured to take into account at least the sizes of memory request buffers of the plurality of memory controllers.

2. The computer implemented system of claim 1, wherein the control component is part of at least one of the plurality of memory controllers.

3. The computer implemented system of claim 2, wherein the state information comprises at least one of a load, load per thread, or row buffer hit-rate for at least one of the plurality of memory controllers.

4. The computer implemented system of claim 3, the course of action further comprising at least one of a joint decision or a coordinated decision, made by the plurality of memory controllers for energy conservation.

5. The computer implemented system of claim 1, further comprising a hardware communication substrate configured to exchange the state information among the plurality of memory controllers.

6. The computer implemented system of claim 4, wherein the course of action is related to energy conservation.

7. The computer implemented system of claim 1, wherein the operation adjustment comprises modifications of at least one of a: clock frequency or scheduling policy.

8. The computer implemented system of claim 1, further comprising an artificial intelligence component configured to facilitate decision making based on inferences for the plurality of memory controllers.

9. A computer implemented method comprising coordinating operations of a plurality of memory controllers by acts including:
    exchanging state information among the memory controllers, the state information including a maximum load among the memory controllers and a current load of at least one of the memory controllers;
    comparing a difference between the maximum load and the current load of the at least one of the memory controllers with a threshold function that takes into account at least the sizes of memory request buffers of the memory controllers; and
    based on the comparing, switching a current scheduling algorithm used by the memory controllers to a different scheduling algorithm for use by the memory controllers.

10. The computer implemented method of claim 9, further comprising reaching at least one of a joint decision or a coordinated decision, by the memory controllers.

11. The computer implemented method of claim 9, further comprising performing computations on the state information to decide a course of action.

12. The computer implemented method of claim 9, further comprising initiating the exchanging based on a predetermined event.

13. The computer implemented method of claim 9, comprising, based on the comparing determining that the difference is greater than the threshold function, switching the current scheduling algorithm to a scheduling algorithm that consumes less energy.

14. The computer implemented method of claim 9, further comprising modifying a clock rate for at least one of the memory controllers.

15. The computer implemented method of claim 9, comprising, based on the comparing determining that the difference is not greater than the threshold function, switching the current scheduling algorithm to a scheduling algorithm that consumes more energy.

16. The computer implemented method of claim 9, further comprising using a constant value as the threshold function.

17. The computer implemented method of claim 10, further comprising accepting input from external components or system software to reach the joint decision.

18. One or more computer storage devices storing computer-executable instructions that, when executed by a processor, cause the processor to perform the method of claim 9.

* * * * *